United States Patent
Sakurai

(10) Patent No.: US 6,751,011 B2
(45) Date of Patent: Jun. 15, 2004

(54) CHARACTERISTIC MEASURING METHOD AND CHARACTERISTIC MEASURING SYSTEM OF WAVELENGTH DIVISION MULTIPLEXING OPTICAL AMPLIFIER

(75) Inventor: Yasuki Sakurai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 137 days.

(21) Appl. No.: 09/945,695

(22) Filed: Sep. 5, 2001

(65) Prior Publication Data

US 2002/0186454 A1 Dec. 12, 2002

(30) Foreign Application Priority Data

Apr. 20, 2001 (JP) ........................................ 2001-122085

(51) Int. Cl.[7] ................................................ H01S 3/00
(52) U.S. Cl. .................. 359/333; 359/337; 359/337.12; 359/337.2
(58) Field of Search ................................ 359/337, 494, 359/333–349, 337.2, 337.12

(56) References Cited

U.S. PATENT DOCUMENTS

| | | | | |
|---|---|---|---|---|
| 5,117,196 A | * | 5/1992 | Epworth et al. ............. | 359/333 |
| 5,223,705 A | * | 6/1993 | Aspell et al. ................ | 250/225 |
| 5,295,015 A | * | 3/1994 | Yoneyama ................... | 359/333 |
| 5,442,623 A | * | 8/1995 | Wu .............................. | 370/224 |
| 5,633,741 A | * | 5/1997 | Giles .......................... | 398/79 |
| 5,680,246 A | * | 10/1997 | Takahashi et al. ...... | 359/341.43 |
| 5,745,283 A | * | 4/1998 | Inagaki et al. .......... | 359/337.13 |
| 5,854,704 A | * | 12/1998 | Grandpierre ................ | 398/202 |
| 5,859,725 A | * | 1/1999 | Sugiya et al. .......... | 359/337.13 |
| 6,023,366 A | * | 2/2000 | Kinoshita ............... | 359/337.12 |
| 6,061,173 A | * | 5/2000 | Yamane et al. ............ | 359/345 |
| 6,160,658 A | * | 12/2000 | Ishikawa ..................... | 359/337 |
| 6,233,091 B1 | * | 5/2001 | Kosaka et al. ........... | 359/341.1 |
| 6,259,553 B1 | * | 7/2001 | Kinoshita ................... | 359/337 |
| 6,456,428 B1 | * | 9/2002 | Nakaji et al. .......... | 359/341.41 |
| 6,493,088 B1 | * | 12/2002 | Hui et al. ................... | 356/450 |

FOREIGN PATENT DOCUMENTS

| | | | | |
|---|---|---|---|---|
| JP | 04181210 A | * | 6/1992 | ........... G02F/01/00 |
| JP | 5-276120 | | 10/1993 | |
| JP | 8-248454 | | 9/1996 | |
| JP | 8-255940 | | 10/1996 | |

* cited by examiner

Primary Examiner—Thomas G. Black
Assistant Examiner—Stephen Cunningham
(74) Attorney, Agent, or Firm—Staas & Halsey LLP

(57) ABSTRACT

The invention is directed to providing a characteristic measuring method and characteristic measuring system of a WDM optical amplifier that enables high speed and accurate measurement of characteristics of an optical amplifier by a measuring system with a simple construction. To this end, with the characteristic measuring method of a WDM optical amplifier according to the invention, for example, a plurality of signal lights corresponding to respective signal light wavelengths in a measurement wavelength band are divided into groups for odd and even channel numbers, such that signal lights of adjacent wavelengths are in different groups, and the power of each signal light is adjusted such that the total power of the signal lights in each group is approximately equal to a preset reference value. Then, a WDM signal light containing the multiplexed signal lights is in turn input to the optical amplifier, and the spectrum of the output light spectrum the optical amplifier is input for each group. Based on the spectrum measurement results for each group, the output signal light power and the spontaneous emission light power of each signal light wavelength in the measurement wavelength band are judged.

14 Claims, 13 Drawing Sheets

EMBODIMENT 1-1 OF CHARACTERISTIC MEASURING SYSTEM ACCORDING TO PRESENT INVENTION

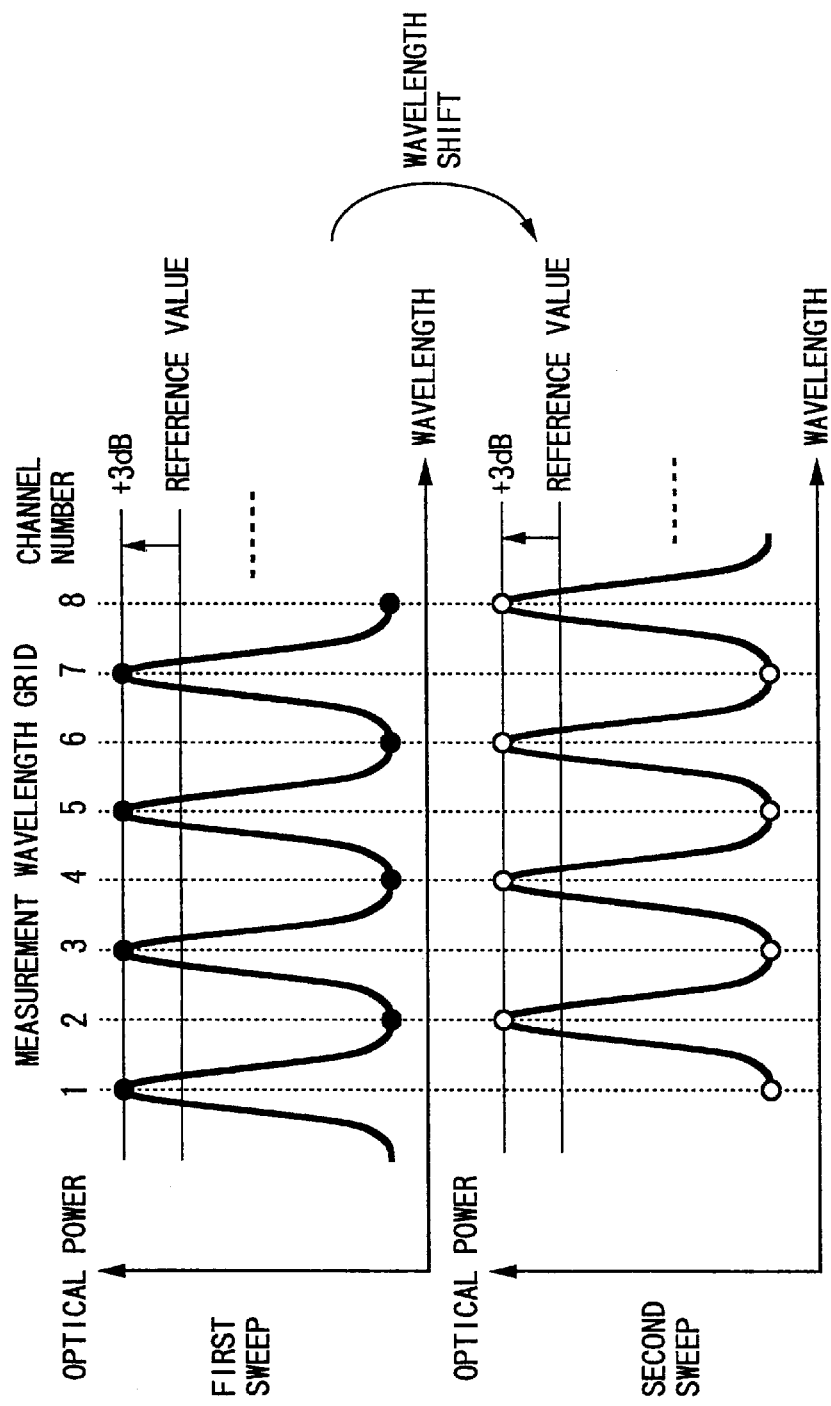

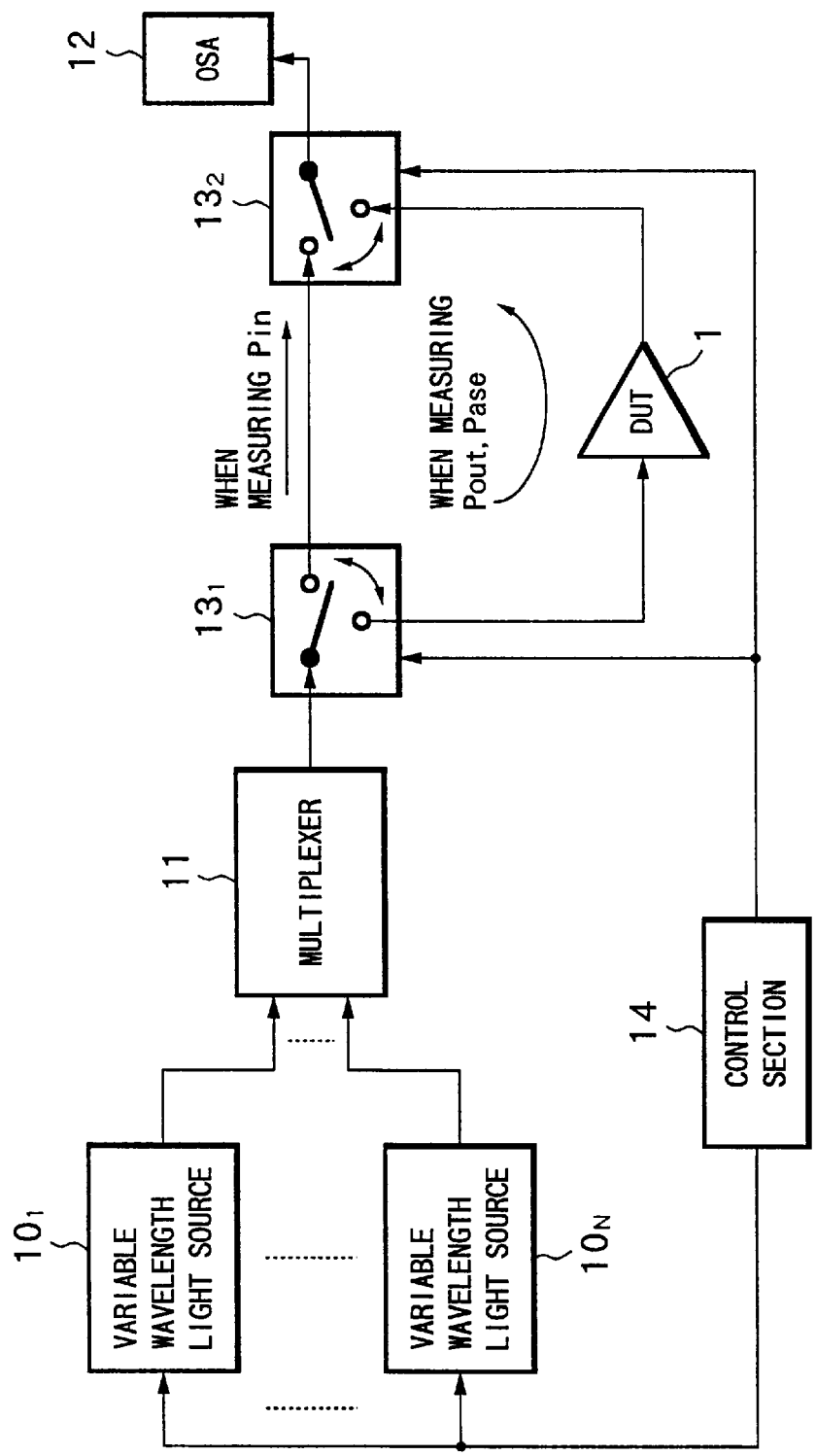
FIG.2 EMBODIMENT 1-1 OF CHARACTERISTIC MEASURING SYSTEM ACCORDING TO PRESENT INVENTION

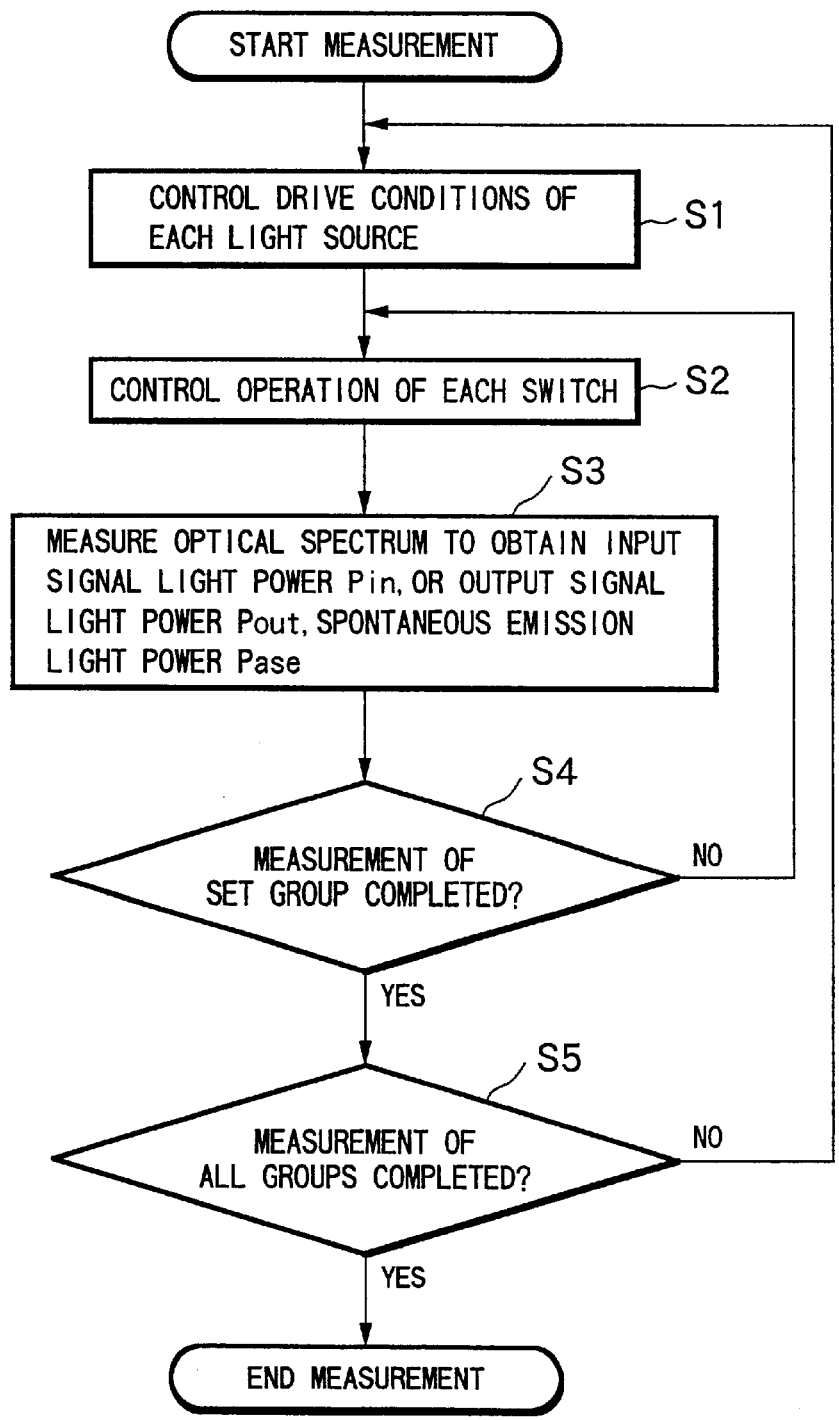

FIG.4

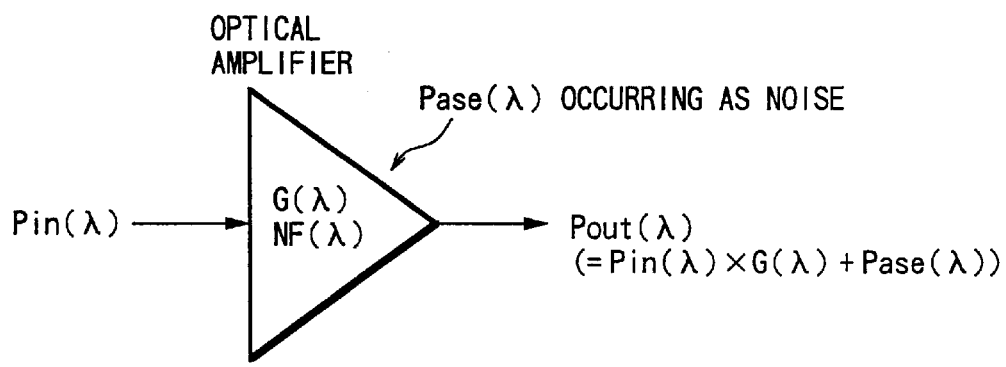

OPTICAL AMPLIFIER

Pase($\lambda$) OCCURRING AS NOISE

Pin($\lambda$) → [G($\lambda$), NF($\lambda$)] → Pout($\lambda$) (= Pin($\lambda$) × G($\lambda$) + Pase($\lambda$))

FIG.5A

EXAMPLE OF WDM SIGNAL LIGHT WITH DENSE WAVELENGTH SPACING

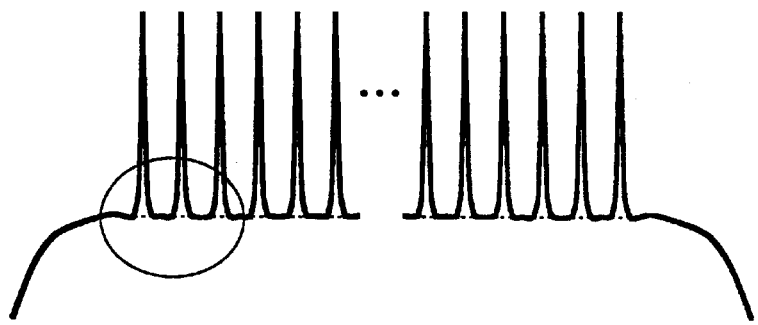

FIG.5B

ENLARGED DIAGRAM OF BASE PART IN CONVENTIONAL MEASURING METHOD

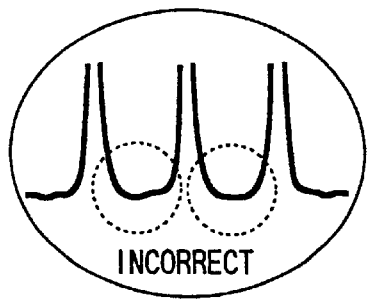

INCORRECT

FIG.5C

ENLARGED DIAGRAM OF BASE PART IN MEASURING METHOD OF PRESENT INVENTION

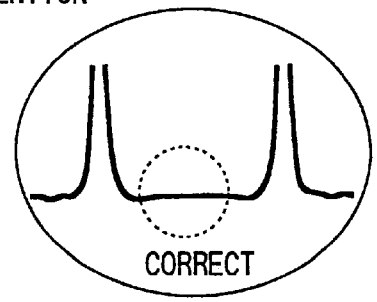

CORRECT

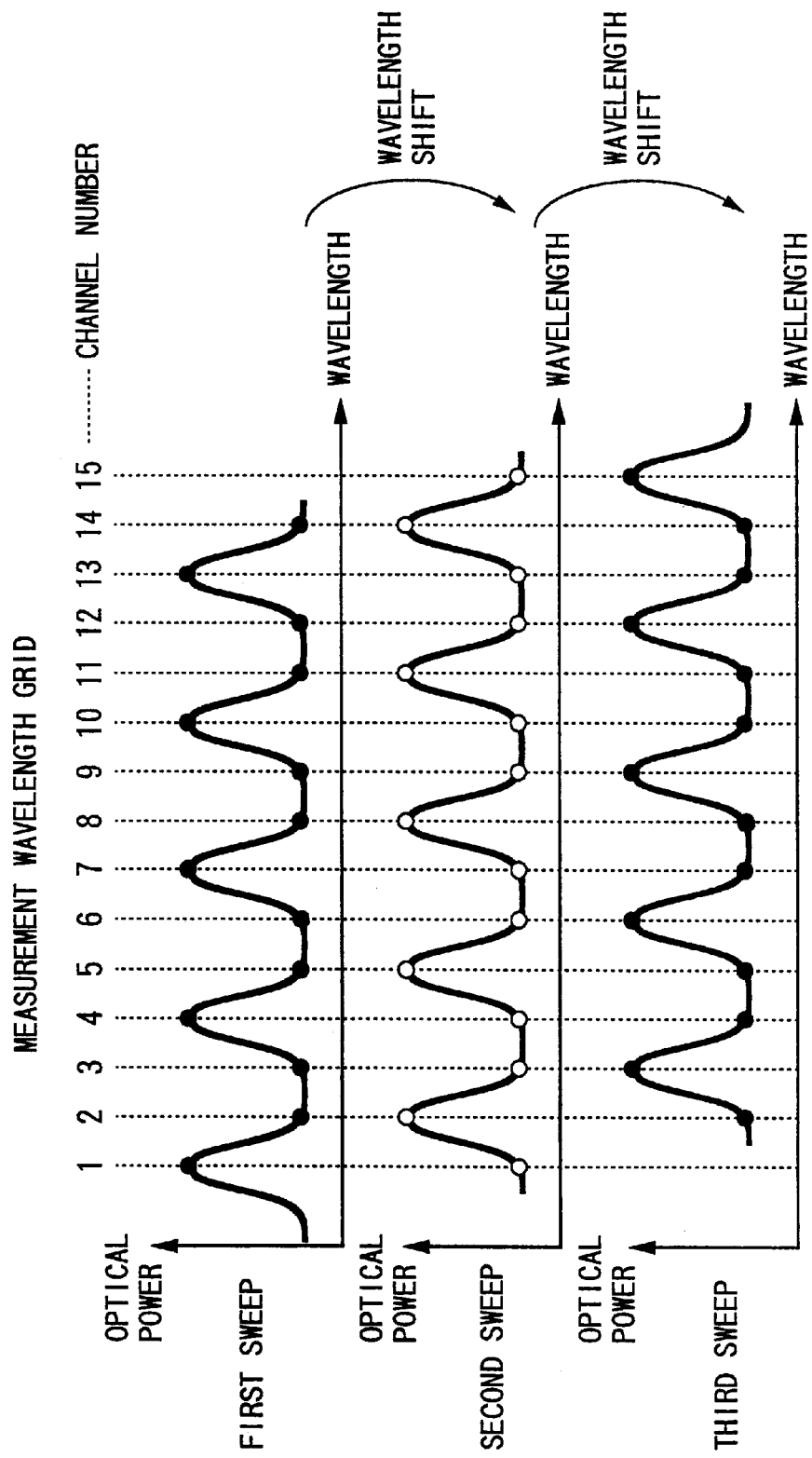

EMBODIMENT 1-2 OF CHARACTERISTIC MEASURING SYSTEM ACCORDING TO PRESENT INVENTION

DIAGRAM FOR EXPLAINING APPLIED EXAMPLE OF
FIRST BASIC PRINCIPLE OF PRESENT INVENTION

CONCEPTUAL DIAGRAM OF SECOND BASIC PRINCIPLE OF PRESENT INVENTION

EMBODIMENT 2-1 OF CHARACTERISTIC MEASURING SYSTEM ACCORDING TO PRESENT INVENTION

SPECIFIC EXAMPLE 1 OF FITTING PROCESS IN CHARACTERISTIC MEASURING METHOD ACCORDING TO SECOND BASIC PRINCIPLE

SPECIFIC EXAMPLE 2 OF FITTING PROCESS IN CHARACTERISTIC MEASURING METHOD ACCORDING TO SECOND BASIC PRINCIPLE

MEASURING SYSTEM OF CONVENTIONAL PULSE METHOD

OUTLINE OF CONVENTIONAL PROBE METHOD

OUTLINE OF CONVENTIONAL INTERPOLATION METHOD

INFLUENCE OF PERFORMANCE OF MEASURING APPARATUS IN CONVENTIONAL INTERPOLATION METHOD

CHARACTERISTIC MEASURING METHOD AND CHARACTERISTIC MEASURING SYSTEM OF WAVELENGTH DIVISION MULTIPLEXING OPTICAL AMPLIFIER

BACKGROUND OF THE INVENTION (1) Field of the Invention

The present invention relates to a method for measuring, effectively and with high accuracy, characteristics of a wavelength division multiplexing optical amplifier to be utilized for optical communications, and a characteristic measuring system applied with the method.

(2) Description of the Related Art

In a WDM optical amplifier for amplifying a wavelength division multiplexed (WDM) signal light containing a plurality of signal lights of different wavelengths, in order to measure and evaluate characteristics thereof, it is necessary to measure accurately a signal light level and a noise light level of each signal light wavelength. To be specific, for example, to obtain gain, noise figure and the like, being typical indexes for indicating characteristics of the optical amplifier, an input signal light level, an output signal light level and an optical noise (spontaneous emission light) level corresponding to each signal light wavelength must each be obtained. It is relatively easy to measure the input signal light level and output signal light level of each wavelength. However, regarding measurement of spontaneous emission light level, it is difficult to measure a spontaneous emission light level corresponding to each wavelength independently, since light output from the optical amplifier contains both an amplified signal light and spontaneous emission light.

For prior art to measure a spontaneous emission light level of an optical amplifier, for example, measuring methods such as a pulse method, a probe method, an interpolation method and the like are known. The pulse method is, for example as described in Japanese Unexamined Patent Publication No. 8-248454, for measuring an output light level at a time of no signal light input, by modulating a signal light at a cycle sufficiently shorter than an atomic lifetime or carrier lifetime of an optical amplification medium. Furthermore, the probe method is a method wherein signal lights of the smaller number of wavelengths than all of the signal light wavelengths in a measurement wavelength band is used to create a simulated saturation state in the optical amplifier of when signal lights of all wavelengths are input, to make the spectrum thereof a spontaneous emission light spectrum. Moreover, the interpolation method is a method for estimating a spontaneous emission light spectrum from an output light spectrum of an optical amplifier by interpolation.

However, the conventional characteristic measuring methods as mentioned in the above have the following problems in terms of accuracy of measured values, measurement speed, simplicity of measuring system and the like. That is to say, a problem of the pulse method is that the measuring system is complicated. For example, as shown in FIG. 15, the pulse method requires a complicated measuring system where the optical paths when measuring the input light power, output light power and spontaneous emission light power are all different. Furthermore, since it is required to compensate for differences in losses in the optical paths, there is also a drawback in that the measurement operation is troublesome. Moreover, since a loss of the modulator is great, the power of light that reaches the measuring device becomes small, so that there is also a problem in that a ratio (optical SN ratio) of signal light to noise light is deteriorated.

Furthermore, a problem of the probe method is that the measurement time becomes long. For example, as shown in FIG. 16, in the probe method, a series of operations is repeated in which, while maintaining a reverse distribution state of the optical amplifier, the level of signal light is measured after the wavelength of a weak probe light is adjusted to a point of wavelength grid to be measured. Hence, the measurement time gets longer in proportion to the number of wavelengths in a WDM signal light.

Moreover, a problem of the interpolation method is that measured value lacks repeatability and accuracy. For example, as shown in FIG. 17, in the interpolation method, the spontaneous emission light level at a wavelength to be measured is not obtained by actual measurement but by estimation. Therefore, there is a possibility that dispersion occurs in the estimated values caused by persons performing measurement or by selection methods for an approximation curve used for interpolation, and repeatability is worsened. Moreover, the spontaneous emission light level to be estimated also depends, for example as shown in FIG. 18, on the performance (especially resolution and dynamic range) of an optical spectrum analyzer. Therefore, if the measurement accuracy is to be increased, the requirement with respect to performance of the measuring device becomes more critical.

SUMMARY OF THE INVENTION

The present invention addresses the abovementioned problems, with an object of providing a characteristic measuring method and a characteristic measuring system of a WDM optical amplifier, capable of performing high speed and accurate measurement of characteristics of an optical amplifier by a measuring system with a simple construction.

To achieve the abovementioned object, with one aspect of a characteristic measuring method of a WDM optical amplifier according to the present invention, in a characteristic measuring method of an optical amplifier for amplifying a WDM signal light in which a plurality of signal lights of different wavelengths are multiplexed, firstly a WDM signal light that does not include a signal light of a first wavelength, being one of the plurality of signal lights, and has the total power approximately equal to the total power of the WDM signal light is input to the optical amplifier. Then, the power of the signal light corresponding to the first wavelength among output signal lights of the optical amplifier is measured, to thereby detect the power of spontaneous emission light corresponding to the first wavelength, from the optical amplifier of when the WDM signal light is input.

According to such a characteristic measuring method, characteristic measurement of an optical amplifier is performed using a WDM signal light from which the signal light of the first wavelength is removed and total power adjusted, thereby enabling actual measurement of the power of spontaneous emission light corresponding to the first wavelength contained in the light output from the optical amplifier.

In one method based on the abovementioned characteristic measuring method, firstly a plurality of signal lights corresponding to respective signal light wavelengths in a measurement wavelength band are divided into at least two or more groups such that signal lights of adjacent wavelengths are in different groups, and the power of each signal light is adjusted such that the total power of the signal lights in each group is approximately equal to a preset reference value. Then, a WDM signal light containing the multiplexed signal lights is input in turn for each group to the optical amplifier, to measure a spectrum of the output light from the optical amplifier for each group. Then, based on these spectrum measurement results, the output signal light power and the spontaneous emission light power of each signal light wavelength in a measurement wavelength band are judged.

According to such a characteristic measuring method, a WDM signal light amplified by the optical amplifier is divided into a plurality of groups for measurement, so that for all of the signal light wavelengths in the measurement wavelength band, it is possible to actually measure the respective powers of the output signal light and the spontaneous emission light that are contained in the light output from the optical amplifier.

Furthermore, for the abovementioned characteristic measuring method, a spectrum of the WDM signal light input to the optical amplifier may be measured, to judge the input signal light power of each signal light wavelength in the measurement wavelength band. By using the input signal light power, the output signal light power and the spontaneous emission light power judged for each signal light wavelength in the measurement wavelength band, it is possible, for example, to calculate gain, noise figure and the like of the optical amplifier.

Moreover, for the abovementioned characteristic measuring method, it is preferable that the distribution of signal light power in the measurement wavelength band in each group is approximately uniform with respect to the wavelength direction. In this manner, the generating condition of spontaneous emission light in the optical amplifier at the time of measurement for each group becomes constant, which enables more accurate measurement of spontaneous emission light power.

According to another aspect of the characteristic measuring method of a WDM optical amplifier according to the present invention, in a characteristic measuring method of an optical amplifier for amplifying a WDM signal light in which a plurality of signal lights of different wavelengths are multiplexed, firstly rearward spontaneous emission light emitted from a signal light input terminal is ejected from spontaneous emission light generated in the optical amplifier input with a WDM signal light, and a spectrum of the rearward spontaneous emission light ejected, and a spectrum of output light containing output signal light and forward spontaneous emission light emitted from a signal light output terminal of the optical amplifier are respectively measured. Then, the spectrum of the rearward spontaneous emission light is fitted to the measured spectrum of the output light from the optical amplifier, and based on the fitted spectrum of the rearward spontaneous emission light, the forward spontaneous emission light power of each signal light wavelength in a measurement wavelength band is judged, and also based on the spectrum of the output light from the optical amplifier, the output signal light power of each signal light wavelength in the measurement wavelength band is judged.

According to such a characteristic measuring method, the fitting process is performed on the spectrum of the actually measured rearward spontaneous emission light, so that a spectrum of the forward spontaneous emission light contained in the output light from the optical amplifier can be estimated with high accuracy. Therefore, it is possible to judge accurately the forward spontaneous emission light power of each signal light wavelength.

For the abovementioned characteristic measuring method, to be specific, the fitting of the rearward spontaneous emission light to the spectrum of the output light from the optical amplifier may be performed using spectrum data of a wavelength region excluding respective signal light wavelengths inside the measurement wavelength band. Alternatively, it may be performed using spectrum data of a wavelength region outside of the measurement wavelength band.

Furthermore, for the abovementioned characteristic measuring method, a relationship between the dependency of the rearward spontaneous emission light on the wavelength and the dependency of the forward spontaneous emission light on the wavelength may be obtained in advance, to correct based on the obtained relationship, the measurement result of the spectrum of the rearward spontaneous emission light. In this manner, differences in wavelength characteristics of the rearward spontaneous emission light and wavelength characteristics of the forward spontaneous emission light are compensated for, so that it is possible to increase measurement accuracy.

A characteristic measuring system of a WDM optical amplifier according to the present invention is applied with each aspect of the characteristic measuring method of the present invention as mentioned above. In such a characteristic measuring system, it is possible to measure the characteristics of optical amplifiers accurately using a measuring system with a simple construction and low loss.

Other objects, features and advantages of this invention will become apparent in the following description of embodiments in relation to the attached drawings.

BRIEF DESCRIPTION OF THE DRAWINGS

FIG. 1 is a diagram for explaining a first basic principle of a characteristic measuring method of a WDM optical amplifier according to the present invention.

FIG. 2 is a diagram showing a construction of an embodiment 1-1 of a characteristic measuring system applied with a characteristic measuring method according to the first basic principle of the present invention.

FIG. 3 is a flow chart showing a procedure of the characteristic measuring method according to the first basic principle of the present invention.

FIG. 4 is a diagram for explaining a gain and noise figure of an optical amplifier calculated by the characteristic measuring method of the present invention.

FIG. 5 is a diagram for explaining an applied example of the characteristic measuring method according to the first basic principle of the present invention.

FIG. 6 is a diagram for explaining one example when a WDM signal light is divided into three groups in the characteristic measuring method according to the first basic principle of the present invention.

DETAILED DESCRIPTION OF THE INVENTION

Figure 7:
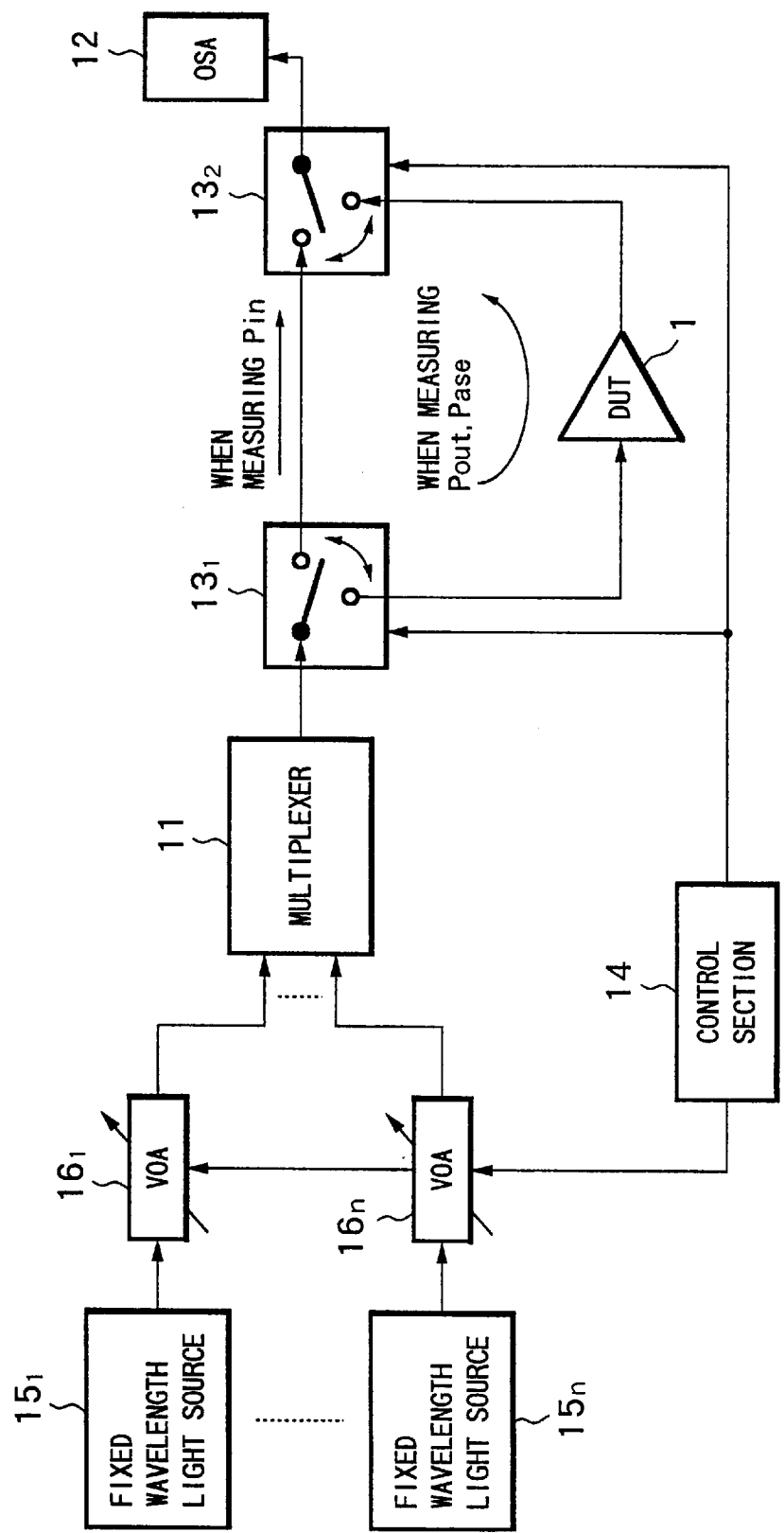
FIG. 7 is a diagram showing a construction of an embodiment 1-2 of the characteristic measuring system applied with the characteristic measuring method according to the first basic principle of the present invention.

As follows is a description of embodiments of the present invention based on the drawings.

FIG. 1 is a diagram for explaining a first basic principle of a characteristic measuring method of a WDM optical amplifier according to the present invention. Furthermore, FIG. 2 is a diagram showing a construction of an embodiment 1-1 of a characteristic measuring system applied with the characteristic measuring method according to the first basic principle. Moreover, FIG. 3 is a flow chart showing a procedure of the characteristic measuring method according to the first basic principle.

As shown in FIG. 2, the configuration of the present characteristic measuring system comprises a plurality (here N) of variable wavelength light sources $10_1$ through $10_N$ for generating signal lights of different wavelengths, a multiplexer 11 for multiplexing the signal lights output from the variable wavelength light sources $10_1$ through $10_N$ to output, an optical spectrum analyzer (OSA) 12 for measuring spectra of input signal lights, optical switches $13_1$ and $13_2$ for performing switching to either input signal lights from the multiplexer 11 to an optical amplifier (DUT) 1 being an object of characteristic measurement and transmit output light from the optical amplifier 1 to the optical spectrum analyzer 12, or transmit the signal lights from the multiplexer 11 directly to the optical spectrum analyzer 12 without using the optical amplifier 1, and a control section 14 for controlling drive conditions of the variable wavelength light sources $10_1$ through $10_N$ and operations of the optical switches $13_1$ and $13_2$.

The optical amplifier 1 may be, for example, a well known WDM optical amplifier, such as an optical fiber amplifier that uses an optical fiber doped with rare earth element and the like as an amplification medium, a Raman amplifier that utilizes the Raman amplification effect, a semiconductor optical amplifier and the like. This optical amplifier 1 can amplify collectively signal lights of respective wavelengths contained in an input WDM signal light to a required level, and also generates noise elements accompanying spontaneous emission light when amplifying the signal lights.

Each of the variable wavelength light sources $10_1$ through $10_N$, for example in a case where signal lights of all wavelengths of a WDM signal light input to the optical amplifier 1 are divided into a plurality (here X) of groups, is allotted a role in generating signal lights of X wavelengths. The abovementioned grouping is performed such that signal lights adjacent to each other on a wavelength grid in a measurement wavelength band do not belong to the same group. Here, as a specific example, consideration is given to a case where channel numbers 1, 2, . . . are assigned to signal lights (channel lights) of all wavelength of a WDM signal light in ascending wavelength order, and the signal lights of respective wavelengths are divided into an odd channel number group and an even channel number group (X=2). In this case, the variable wavelength light source $10_1$ generates signal lights of both channel numbers 1 and 2, and the variable wavelength light source $10_2$ generates signal lights of both channel numbers 3 and 4. Similarly, the variable wavelength light source $10_N$ generates signal lights of both channel numbers 2N−1 and 2N.

The control section 14 controls each wavelength and output light power of the variable wavelength light sources $10_1$ through $10_N$ according to a measurement procedure to be described later, and also interlocks optical switches $13_1$ and $13_2$ to control switching of optical path. Each signal light output from the variable wavelength light sources $10_1$ through $10_N$, whose drive conditions are controlled by this control section 14, after being multiplexed by the multiplexer 11, is transmitted to the optical spectrum analyzer 12 via an optical path connecting the optical switches $13_1$ and $13_2$, at the time of measuring the input signal light power Pin to the optical amplifier 1, and is transmitted to the optical spectrum analyzer 12 via an optical path connecting the optical switch $13_1$, the optical amplifier 1 and the optical switch $13_2$, at the time of measuring the light power (output signal light power Pout and spontaneous emission light power Pase) output from the optical amplifier 1.

With a characteristic measuring system of the construction as mentioned above, as shown in the flow chart in FIG. 3, when characteristic measurement of the optical amplifier 1 is started, in step 1 (shown by S1 in the figure, and similarly for the following steps), the wavelength and power of each signal light output from the variable wavelength light sources $10_1$ through $10_N$ are controlled by the control section 14. Here, as shown in FIG. 1 for example, the wavelength of each light source is controlled such that firstly the signal lights of the odd channel numbers 1, 3, 5, . . . are output from the variable wavelength light sources $10_1$, $10_2$, $10_3$, . . . respectively. Furthermore, the power of each signal light is controlled such that the total power of the signal lights in the odd channel number group is almost equal to the total power (reference value) of the signal lights of all wavelengths to be originally measured for the optical amplifier 1. Such a control of each signal light power is performed based on a principle that when the total power of the signal lights input to the optical amplifier is equal, the dependencies of gain and spontaneous emission light on wavelength are not changed. To be specific, the signal light power of each of the odd channel numbers can be set so as to be +3 dB (twice) above the preset signal light power for one channel to be measured originally.

When control of the drive condition of each of the variable wavelength light sources $10_1$ through $10_N$ is completed, in step 2, the operations of the optical switches $13_1$ and $13_2$ are controlled by the control section 14. Here, firstly, to measure the signal light power Pin input to the optical amplifier 1, an optical path directly connecting the optical switches $13_1$ and $13_2$ is selected, and control proceeds to step 3. In step 3, a signal light spectrum of the odd channel numbers that passed through the optical switches $13_1$ and $13_2$ after being output from each of the variable wavelength light sources $10_1$ through $10_N$ and multiplexed by the multiplexer 11 is measured by the optical spectrum analyzer 12. In this manner, the input signal light power Pin to the optical amplifier 1 is obtained for each of the wavelengths corresponding to the odd channel numbers.

Next, in step 4, it is judged whether or not, for the group set up in step 1, measurement of the input signal light power Pin, the output signal light power Pout and the spontaneous emission light power Pase has been completed. In the case where measurement has not been completed, control returns to step 2, where the optical switches $13_1$ and $13_2$ are switched, and an optical path connecting the optical switch $13_1$, the optical amplifier 1 and the optical switch $13_2$ is selected. In this manner, the signal lights of the odd channel numbers that are output from the variable wavelength light sources $10_1$ through $10_N$, and multiplexed by the multiplexer 11 are input to the optical amplifier 1 via the optical switch $13_1$. The signal light and spontaneous emission light output from the optical amplifier 1 are transmitted to the optical spectrum analyzer 12 via the optical switch $13_2$. Then, control proceeds to step 3, where a spectrum of output light from the optical amplifier 1 is measured by the optical spectrum analyzer 12. In this manner, as shown by the upper part (first sweep) of FIG. 1, the output signal light power Pout is obtained from the odd channel numbers that had signal light inputs, and the spontaneous emission light power Pase is obtained from the even channel numbers that had no signal light inputs.

When it is judged in step 4 that measurement corresponding to the odd channel numbers has been completed, control proceeds to step 5, where it is judged whether or not measurement corresponding to all of the groups has been completed. In the case where measurement corresponding to the even channel numbers has not been performed, control returns to step 1, where the drive conditions of the variable wavelength light sources $10_1$ through $10_N$ are controlled, and signal lights of the even channel numbers 2, 4, 6, . . . are output from the variable wavelength light sources $10_1$, $10_2$, $10_3$, respectively. Here, the power of the signal light of each of the even channel numbers is set, similarly to the case of the odd channel numbers, so as to be +3 dB (twice) above the preset signal light power for one channel to be measured originally. Then, the processings of step 2 through step 4 described above are performed similarly, and the signal light power Pin input to the optical amplifier 1 is obtained for the even channel numbers. Furthermore, as shown by the lower part (second sweep) of FIG. 1, the output signal light power Pout for the wavelengths corresponding to the even channel numbers which had signal light inputs, and the spontaneous emission light power Pase for the wavelengths corresponding to the odd channel numbers which had no signal light inputs are obtained. The following Table 1 shows the correspondence relationship between the output signal light power Pout and the spontaneous emission light power Pase that are obtained by the first and second sweeps in the measurement of the spectrum of the output light from the optical amplifier 1, and the channel numbers.

TABLE 1

| Channel number | First Sweep | Second Sweep |
|---|---|---|
| 1 | Pout | Pase |
| 2 | Pase | Pout |
| 3 | Pout | Pase |
| 4 | Pase | Pout |

TABLE 1-continued

| Channel number | First Sweep | Second Sweep |
|---|---|---|
| 5 | Pout | Pase |
| 6 | Pase | Pout |
| 7 | Pout | Pase |
| 8 | Pase | Pout |
| - - - | - - - | - - - |

In the abovementioned manner, it is possible to utilize the actual measured values of the signal light power Pin, the output signal light power Pout and the spontaneous emission light power Pase obtained for the optical amplifier 1, for example, to calculate the gain, noise figure and the like, being typical indexes indicating the characteristics of an optical amplifier. To be specific, in a case of an optical amplifier as shown in FIG. 4, the gain $G(\lambda)$ and the noise figure $NF(\lambda)$ for a signal light wavelength $\lambda$ can be calculated using equations (1) and (2) as shown in the following Expression 1.

[Expression 1]

$$G(\lambda) = \{Pout(\lambda) - Pase(\lambda)\}/Pin(\lambda) \qquad (1)$$

$$NF(\lambda) = Pase(\lambda)/\{h\nu G(\lambda)\Delta\nu\} \qquad (2)$$

where h is Boltzmann's constant, $\nu$ is the frequency of the signal light, and $\Delta\nu$ is the frequency bandwidth of the measuring device at the time of measuring the spontaneous emission light power Pase.

In this manner, using a characteristic measuring system applied with the characteristic measuring method according to the first basic principle, a WDM signal light amplified by the optical amplifier 1 is divided into a group of odd channel numbers and a group of even channel numbers for measurement, thus enabling actual measurement of the spontaneous emission light power Pase as well as the input signal light power Pin and the output signal light power Pout for all of the channel numbers. Furthermore, in the present characteristic measuring method, since a measuring system with very low loss can be constructed, it is possible to suppress SN characteristic requirements for the measuring equipment, and also achieve a high sweep speed. Moreover, basically, the present characteristic measuring system can actually measure the input and output signal light powers Pin and Pout, and spontaneous emission light power Pase using only a WDM light source and an optical spectrum analyzer, so that accurate measurement can be performed with the simpler construction than conventional various measuring systems.

Here, it is also easy to apply the above mentioned characteristic measuring method according to the first basic principle as a measuring method that relaxes the restriction on the performance of the measuring equipment compared with existing measuring methods wherein the measured values depend heavily on the performance of the measuring equipment (especially resolution and dynamic range). For example, in a conventional interpolation method, it is required to perform interpolation by accurately measuring the spontaneous emission light level at the base part of the spectrum in a WDM signal light of dense wavelengths as shown in FIG. 5A. However, in a case where there is a lack of resolution and dynamic range in the measuring equipment, the level at the base part of the spectrum is inaccurate as shown in FIG. 5B, so that it is difficult to obtain an accurate level of the spontaneous emission light of the signal light wavelengths by interpolation. On the other hand, as shown in FIG. 5C, if the WDM signal light is divided into a plurality of groups to be input to the optical amplifier, it is possible to widen the base part of the spectrum, to avoid an inaccurate region caused by limitations in the resolution and dynamic range of the measuring equipment so that the level of the spontaneous emission light in the signal light wavelengths can be obtained accurately by interpolation.

Furthermore, in the description of the characteristic measuring method according to the first basic principle mentioned above, one example in which the WDM signal light is divided into two groups of odd and even channel numbers has been shown. However, the characteristic measuring method according to the first basic principle is not limited to this example. The WDM signal light may be divided into groups of three or more. For example, in a case where a WDM signal light is divided into three groups such that each group contains signal lights of every third channel number, to be specific, when dividing into a first group of channel numbers 1, 4, 7, . . . , a second group of channel numbers 2, 5, 8, . . . , and a third group of channel numbers 3, 6, 9, . . . , the output light spectrum corresponding to the abovementioned FIG. 1 becomes as shown in FIG. 6. The following Table 2 shows the correspondence relationship between the output signal light power Pout and the spontaneous emission light power Pase that are obtained by the first through third sweeps in the measurement of the output light spectrum from the optical amplifier 1, and the channel numbers.

TABLE 2

| Channel number | First Sweep | Second Sweep | Third Sweep |
| --- | --- | --- | --- |
| 1 | Pout | (Pase) | (Pase) |
| 2 | (Pase) | Pout | (Pase) |
| 3 | (Pase) | (Pase) | Pout |
| 4 | Pout | (Pase) | (Pase) |
| 5 | (Pase) | Pout | (Pase) |
| 6 | (Pase) | (Pase) | Pout |
| 7 | Pout | (Pase) | (Pase) |
| 8 | (Pase) | Pout | (Pase) |
| 9 | (Pase) | (Pase) | Pout |
| 10 | Pout | (Pase) | (Pase) |
| 11 | (Pase) | Pout | (Pase) |
| 12 | (Pase) | (Pase) | Pout |
| 13 | Pout | (Pase) | (Pase) |
| 14 | (Pase) | Pout | (Pase) |
| 15 | (Pase) | (Pase) | Pout |
| - - - | - - - | - - - | - - - |

However, as shown in the above Table 2, since the spontaneous emission light power Pase corresponding to each channel number is measured twice, one of the measured values may be adopted as the spontaneous emission light power Pase, or an average and the like of the two measured values may be adopted as the spontaneous emission light power Pase.

By dividing a WDM signal light into three groups as mentioned above, the number of variable wavelength light sources becomes one third of the total number of channels. Therefore, the number of variable wavelength light sources to be prepared can be reduced by increasing the number of groups. In this manner, it is possible to achieve a reduction in the construction cost of a characteristic measuring system. However, by increasing the number of groups, the number of sweeps of spectrum measurement is increased, which makes the measurement time a little longer. Therefore, the number of groups of WDM signal lights may be set appropriately according to the number of variable wavelength light sources that can be provided and the measurement time allowed.

Here, in the above description, the case where a WDM signal light is divided into three groups has been shown as an example. However, in a case where the number of groups is generalized and represented as X ($X \geq 2$), signal lights of every X-1 channel number are respectively contained in each group.

Next is a description of an embodiment 1-2 of the characteristic measuring system applied with the characteristic measuring method according to the first basic principle.

FIG. 7 is a diagram showing a construction of the characteristic measuring system according to the abovementioned embodiment 1-2. Here, the same symbols are used for the same construction as in the abovementioned embodiment 1-1, and the same applies hereunder.

In FIG. 7, the part where the construction of the present characteristic measuring system differs from the construction of the embodiment 1-1 shown in FIG. 2 described above is the part where fixed wavelength light sources $15_1$ through $15_n$ and variable optical attenuators (VOA) $16_1$ through $16_n$ are installed, instead of the variable wavelength light sources $10_1$ through $10_N$. The construction of the parts other than those mentioned above is the same as in the case of the embodiment 1-1, and hence the description is omitted here.

Each of the fixed wavelength light sources $15_1$ through $15_n$ generates a signal light of a fixed wavelength corresponding to any one of the wavelengths of the WDM signal light capable to be input to the optical amplifier 1. The signal light generated in each of the fixed wavelength light sources $15_1$ through $15_n$ is output with sufficient power required for the characteristic measurement of the optical amplifier 1.

The variable optical attenuators $16_1$ through $16_n$ attenuate the signal lights output from the corresponding fixed wavelength light sources $15_1$ through $15_n$ respectively according to an amount of each variable optical attenuation, to output to the multiplexer 11. The amount of optical attenuation of each of the variable optical attenuators $16_1$ through $16_n$ is controlled in response to control signals from the control section 14.

In the characteristic measuring system as mentioned above, when characteristic measurement of the optical amplifier 1 is started, a signal light of a required power is output from each of the fixed wavelength light sources $15_1$ through $15_n$, the optical attenuation amount of each of the variable optical attenuators $16_1$ through $16_n$ is controlled by the control section 14, and thus grouping of the WDM signal light input to the optical amplifier 1 is performed. Here, similarly to the case of the embodiment 1-1, if for example consideration is given for a case where the channel numbers are divided into an odd channel number group and an even channel number group, when performing measurement corresponding to the odd number group, the optical attenuation amount of the variable optical attenuators $16_1, 16_3, 16_5, \ldots$ corresponding to the odd channel numbers is controlled such that the signal light power of each of the odd channel numbers is +3 dB (twice) above the preset signal light power for one channel to be measured originally. Furthermore, the optical attenuation amount of the variable optical attenuators $16_2, 16_4, 16_6, \ldots$ corresponding to the even channel numbers is controlled to be at the maximum, and the signal lights of the even channel numbers are blocked. On the other hand, when performing measurement corresponding to the even number group, the optical attenuation amount of the variable optical attenuators $16_2, 16_4, 16_6, \ldots$ corresponding to the even channel numbers is controlled such that the signal light power of each of the even channel numbers is +3 dB (twice) above the preset signal light power for one channel to be measured originally. Moreover, the optical attenuation amount of the variable optical attenuators $16_1$, $16_3$, $16_5$, . . . corresponding to the odd channel numbers is controlled to be at the maximum, and the signal lights of the odd channel numbers are blocked.

The signal lights of the odd and even channel numbers grouped as mentioned above are multiplexed by the multiplexer 11, and thereafter, according to the same procedure as in the case of the embodiment 1-1 shown in the abovementioned FIG. 3, transmitted to the optical spectrum analyzer 12 via the optical switches $13_1$ and $13_2$ when measuring the input signal light power Pin, and transmitted to the optical spectrum analyzer 12 via the optical switch $13_1$, the optical amplifier 1 and the optical switch $13_2$ when measuring the output signal light power Pout and the spontaneous emission light power Pase. As a result, it is possible to actually measure the input signal light power Pin, the output signal light power Pout and the spontaneous emission light power Pase for all of the channel numbers.

In this manner, a similar effect to the case of the embodiment 1-1 can also be obtained by the characteristic measuring system of the embodiment 1-2 using the fixed wavelength light sources $15_1$ through $15_n$.

Here, the powers of the signal lights output from the fixed wavelength light sources $15_1$ through $15_n$ have been controlled using the variable optical attenuators $16_1$ through $16_n$, and the WDM signal light has been divided into groups. However, the present invention is not limited to this. The drive conditions of each of the fixed wavelength light sources $15_1$ through $15_n$ may be directly controlled in response to output signals from the control section 14. Further, the WDM signal light has been divided into two groups. However, as described in the above, the WDM signal light may be divided into groups of three or more. Furthermore, in the embodiment 1-2, similarly to the case of the embodiment 1-1, measurement of the input signal light power Pin has been performed for each of the groups of odd numbers and even numbers. However, for measurement of the input signal light power Pin, by adjusting all of the signal lights output from the fixed wavelength light sources $15_1$ through $15_n$ to a required level by the variable optical attenuators $16_1$ through $16_n$, to measure collectively the optical spectrums. In this manner, the measurement time can further be reduced.

Here is a description of an applied example to enhance the accuracy of characteristic measurement method according to the first basic principle.

In the characteristic measuring method according to the first basic principle, when dividing the WDM signal light into a plurality of groups, in order that the dependencies of gain and spontaneous emission light of the optical amplifier on wavelength are not changed, the construction is such that the total power of the signal lights contained in each group is almost equal to the total power of the signal lights of all wavelengths to be measured originally for the optical amplifier 1. In order to more accurately measure the generating condition of spontaneous emission light in the optical amplifier, it is further desirable to make the power distribution of the signal lights equal for each group. In the conditions as shown in the abovementioned FIG. 1, since a lot of signal lights at similar levels are arranged into groups of odd numbers and even numbers, the optical power distribution in the measurement wavelength band is relatively equal for each group. However, for example, in a case where the number of signal lights arranged in the measurement wavelength band in each group becomes less, there is a tendency that the optical power distribution of one group is biased toward the short wavelength side, and the optical power distribution of the other group is biased toward the long wavelength side. In such a case, since the generating condition of spontaneous emission light is changed in each group, an error occurs between the values measured for each group.

Figure 8:
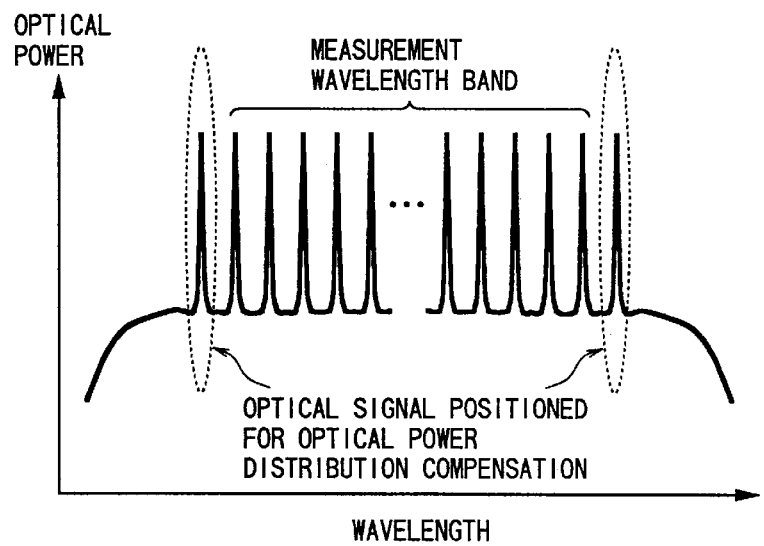
FIG. 8 is a diagram for explaining an applied example to enhance the accuracy of the characteristic measuring method according to the first basic principle of the present invention.

Accordingly, as shown in FIG. 8 for example, light for compensating the bias of the optical power distribution is intentionally provided on the outside of the measurement wavelength band or the like equal to make the optical power distribution of each group approximately equal. To be specific, for a group whose optical power distribution is comparatively biased toward the short wavelength side, light of a power corresponding to the degree of bias is provided outside of the long wavelength side of the measurement wavelength band, and for a group whose optical power distribution is comparatively biased toward the long wavelength side, light of a power corresponding to the degree of bias is provided outside of the short wavelength side of the measurement wavelength band. At this time, the power of each signal light provided within the measurement wavelength band is adjusted such that the total power of all of the signal lights that contain the light provided for compensation of the optical power distribution of each group is approximately equal to the total power of the signal lights of all wavelengths to be measured originally.

In this manner, the optical power distribution and the total power of each group whose wavelength is shifted is approximately equal, and the generating condition of spontaneous emission light in the optical amplifier becomes constant, so that more accurate measurement of the spontaneous emission light power Pase is enabled.

Here, the light to compensate for the bias of the optical power distribution is provided outside of the measurement wavelength band. However, the provision of light for compensation is not limited to this. For example, the light for compensation may be provided at a required position that is within the measurement wavelength band, but is not on the measurement wavelength grid. Furthermore, it is also possible that instead of providing the light for compensation separately, the power of each of the signal lights in each group is adjusted individually such that bias of the optical power distribution is offset.

Next is a description of a second basic principle of a characteristic measuring method of a WDM optical amplifier according to the present invention.

Figure 9:
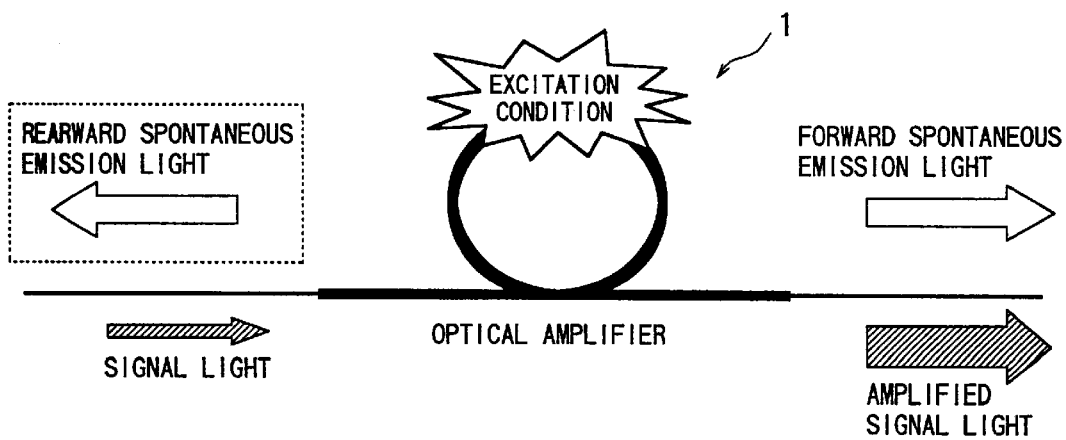
FIG. 9 is a conceptual diagram for explaining a characteristic measuring method according to a second basic principle of the present invention.

FIG. 9 is a conceptual diagram for explaining a characteristic measuring method according to the second basic principle. Furthermore, FIG. 10 is a diagram showing a construction of an embodiment 2-1 of a characteristic measuring system applied with the characteristic measuring method according to the second basic principle.

The characteristic measuring method according to the second basic principle as shown in FIG. 9, is a method wherein, in regard to the well known optical amplifier 1 being an object to be measured, by utilizing the spectrum of the spontaneous emission light (referred to hereunder as rearward spontaneous emission light) emitted from the signal light input terminal, the power at the signal light wavelengths of the spontaneous emission light (referred to hereunder as forward spontaneous emission light) emitted from the signal light output terminal of the optical amplifier is measured.

Figure 10:
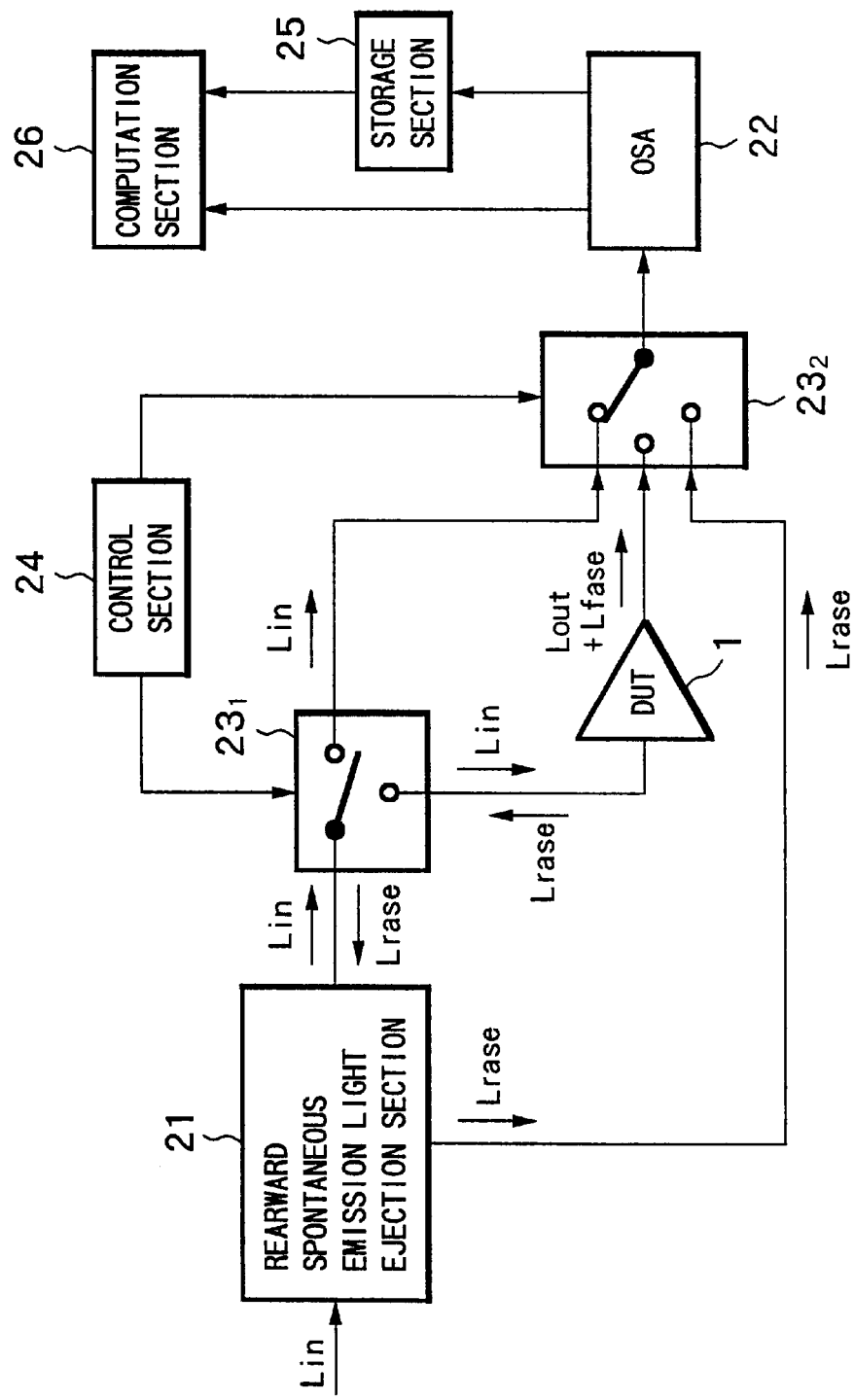
FIG. 10 is a diagram showing a construction of an embodiment 2-1 of a characteristic measuring system applied with the characteristic measuring method according to the second basic principle of the present invention.

The construction of the characteristic measuring system applied with this characteristic measuring method comprises, as shown in FIG. 10, a rearward spontaneous emission light ejection section 21 for ejecting a rearward spontaneous emission light Lrase which is propagated through in the reverse direction to a signal light Lin that is input to the optical amplifier (DUT) 1, an optical spectrum analyzer (OSA) 22 for measuring the spectrum of signal light, optical switches 23$_1$ and 23$_2$ for switching a path of light input to the optical spectrum analyzer 22, a control section 24 for controlling the operations of the optical switches 23$_1$ and 23$_2$, a storage section 25 for storing measurement results of the optical spectrum analyzer 22, and a computation section 26 for performing computation such as fitting and the like using the measurement results of the optical spectrum analyzer 22 and stored data of the storage section 25.

Figure 11:
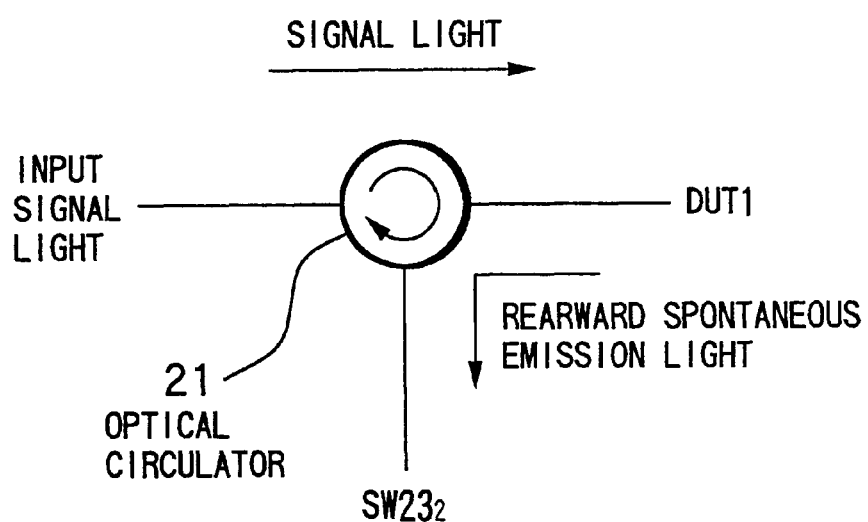
FIG. 11 is a diagram showing a specific example of a rearward spontaneous emission light ejection section used for the characteristics measuring system of the embodiment 2-1.

The rearward spontaneous emission light ejection section 21 passes the input signal light Lin therethrough to send it to the optical switch 23$_1$, and also extracts the rearward spontaneous emission light Lrase whose propagation direction is in reverse to the input signal light Lin to send it to the optical switch 23$_2$. Here, the input signal light Lin includes the signal lights of all of the wavelengths in the measurement wavelength band. For a specific construction of the abovementioned rearward spontaneous emission light ejection section 21, it is possible to utilize an optical circulator or the like having at least three ports as shown in FIG. 11 for example. However, the construction of the rearward spontaneous emission light ejection section 21 is not limited to this.

The optical switch 23$_1$ switches between an optical path that transmits the input signal light Lin to the optical switch 23$_2$ without using the optical amplifier 1, and an optical path that transmits the input signal light Lin to the optical amplifier 1. Furthermore, the optical switch 23$_2$ switches among an optical path that transmits the input signal light Lin transmitted from the optical switch 23$_1$ directly to the optical spectrum analyzer 22, an optical path that transmits the output light (output signal light Lout and the forward spontaneous emission light Lfase) from the optical amplifier 1 to the optical spectrum analyzer 22, and an optical path that transmits the rearward spontaneous emission light Lrase ejected by the rearward spontaneous emission light ejection section 21 to the optical spectrum analyzer 22. Furthermore, the control section 24 interlocks the optical switches 23$_1$ and 23$_2$ according to a measurement procedure described later, to control the switching of the optical paths.

Figure 12:
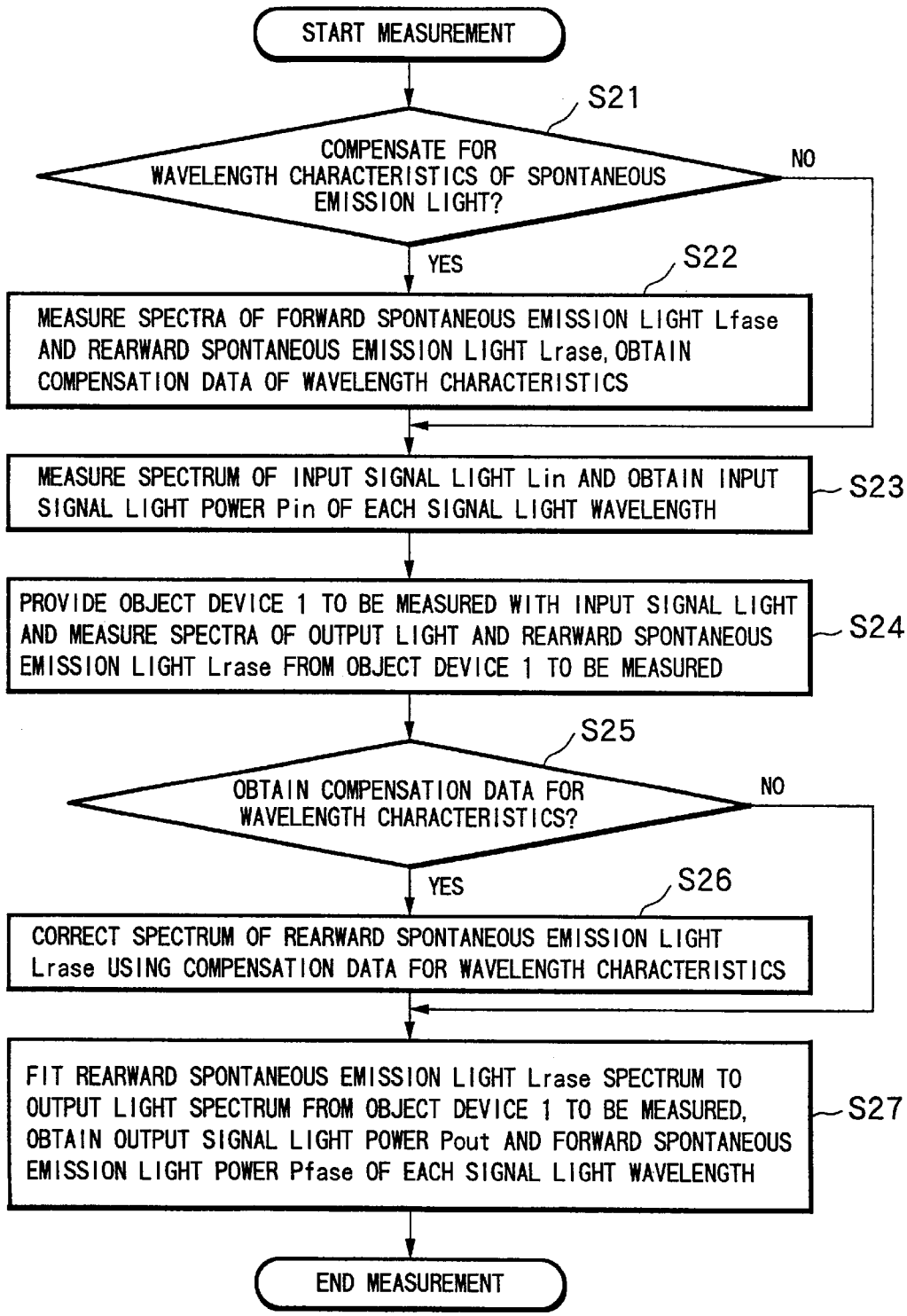
FIG. 12 is a flow chart showing a procedure of the characteristic measuring method according to the second basic principle of the present invention.

In a characteristic measuring system having a construction as mentioned above, for example as shown in the flow chart of FIG. 12, when characteristic measurement of the optical amplifier 1 is started, firstly in step 21, it is judged whether or not compensation of the dependency (wavelength characteristics) of optical power on wavelength is performed for the forward spontaneous emission light Lfase and the rearward spontaneous emission light Lrase. In a case where compensation of wavelength characteristics is performed, control proceeds to step 22, while in a case where compensation of wavelength characteristics is not performed, control proceeds to step 23.

In step 22, the wavelength characteristics of the forward spontaneous emission light Lfase and the wavelength characteristics of the rearward spontaneous emission light Lrase are measured. To be specific, in a condition where a signal light is not input to the excited optical amplifier 1, both the spectra of the forward spontaneous emission light Lfase and the rearward spontaneous emission light Lrase are measured by the optical spectrum analyzer 22. Then, by comparing the measured two spectra by the computation section 26, the relationship between the wavelength characteristics of the forward spontaneous emission light Lfase and the wavelength characteristics of the rearward spontaneous emission light Lrase is obtained, and the result is stored in the storage section 25 as data for compensation of the wavelength characteristics.

Data regarding the wavelength characteristics of the spontaneous emission light obtained here also contains loss characteristics for the wavelengths of the optical components that exist in the ejection path of the rearward spontaneous emission light Lrase. Furthermore, the process for compensation of wavelength characteristics as mentioned above can be omitted either in a case where there is no significant difference between the wavelength characteristics of the forward spontaneous emission light Lfase and the wavelength characteristics of the rearward spontaneous emission light Lrase, and also the optical components have no dependency of loss on wavelength, or depending on the measurement accuracy required. In this case, control proceeds from step 21 to step 23.

In step 23, the spectrum of the input signal light Lin to the optical amplifier 1 is measured, and the input signal light power Pin at each of the signal light wavelengths in the measurement wavelength band is obtained. At this time, in the optical switch 23$_1$, the optical path that transmits the input signal light Lin to the optical switch 23$_2$ without using the optical amplifier 1 is selected, and in the optical switch 23$_2$, the optical path that transmits the input signal light Lin from the optical switch 23$_1$ to the optical spectrum analyzer 22 is selected.

When the measurement of the input signal light power Pin has been completed, control proceeds to step 24, where the input signal light Lin is applied to the optical amplifier 1, and measurement of both the spectra of the output light from the optical amplifier 1 and the rearward spontaneous emission light Lrase is performed. To be specific, the optical switch 23$_1$ is switched to select the optical path that transmits the input signal light Lin to the optical amplifier 1. When performing measurement of the spectrum of the output light from the optical amplifier 1, by switching the optical switch 23$_2$, the optical path that transmits the output light from the optical amplifier 1 to the optical spectrum analyzer 22 is selected. When performing measurement of the spectrum of the rearward spontaneous emission light Lrase, the optical path that transmits the rearward spontaneous emission light Lrase ejected from the rearward spontaneous emission light ejection section 21 to the optical spectrum analyzer 22 is selected.

When measurement of both the spectra of the output light from the optical amplifier 1 and the rearward spontaneous emission light Lrase has been completed, control proceeds to step 25, and it is judged whether or not the process of step 22 has been performed, that is to say, whether data for compensating the wavelength characteristics between the forward spontaneous emission light Lfase and the rearward spontaneous emission light Lrase has been obtained. In the case where the data for wavelength characteristic compensation has been obtained, control proceeds to step 26, while in the case where it has not been obtained, control proceeds to step 27.

In step 26, using the data for the wavelength characteristic compensation stored in the storage section 25, correction of the spectrum of the rearward spontaneous emission light Lrase measured in step 24 is performed in the computation section 26. By this correction process, a difference between the wavelength characteristics of the forward spontaneous emission light Lfase and the wavelength characteristics of the rearward spontaneous emission light Lrase that are contained in the output light from the optical amplifier 1 is compensated.

In step 27, fitting process of the output light spectrum from the optical amplifier 1 and the rearward spontaneous emission light Lrase spectrum measured in step 24 is performed in the computation section 26. The output signal light power Pout and the forward spontaneous emission light power Pfase of each signal light wavelength are respectively obtained.

Here is a description of a specific method of the above-mentioned fitting process.

Figure 13:
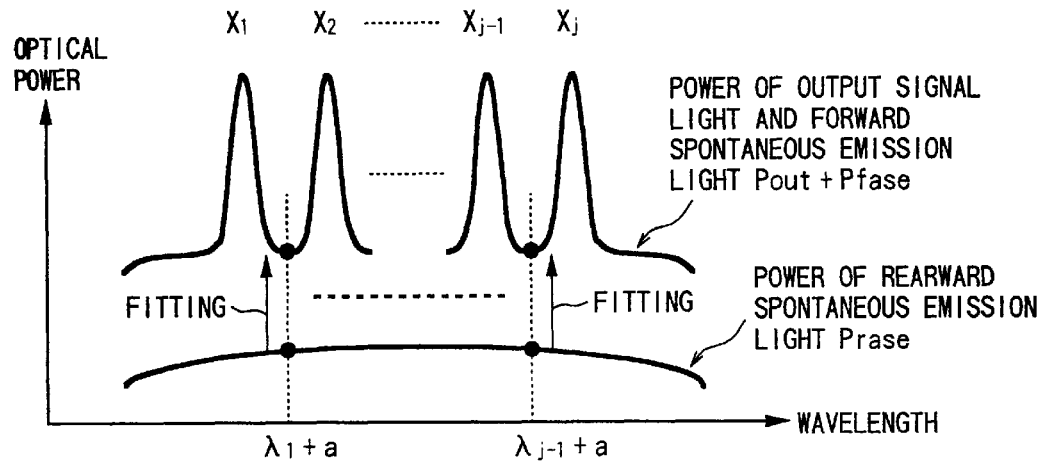
FIG. 13 is conceptual diagram showing one example of a fitting process performed by the characteristic measuring method according to the second basic principle of the present invention.

FIG. 13 is a conceptual diagram showing one example of fitting process performed in the characteristic measuring method according to the second basic principle.

In the example shown in FIG. 13, in a case where as a WDM signal light to be input to the optical amplifier 1, signal lights $X_1, X_2, \ldots, X_j$ of j numbers of wavelengths (the respective wavelengths here being $\lambda_1, \lambda_2, \ldots, \lambda_j$) are multiplexed with the space between wavelengths being $2a$, regarding the spectrum of the rearward spontaneous emission light Lrase as shown in the lower part of the figure and the spectrum of the output light from the optical amplifier 1 as shown in the upper part of the figure, the power levels at each of the wavelengths $\lambda_1+a, \lambda_2+a \ldots, \lambda_j+a$ that are located centrally between each of the signal light wavelengths $\lambda_1, \lambda_2, \ldots, \lambda_j$ are obtained. The spectrum of the rearward spontaneous emission light Lrase is fitted to the spectrum of the output light from the optical amplifier 1 such that the maximum deviation in the difference between the two power level values corresponding to each of the wavelengths $\lambda_1+a, \lambda_2+a \ldots, \lambda_j+a$ is the lowest, or the mean value of the diviation in the difference between the two power level values is the lowest.

Figure 14:
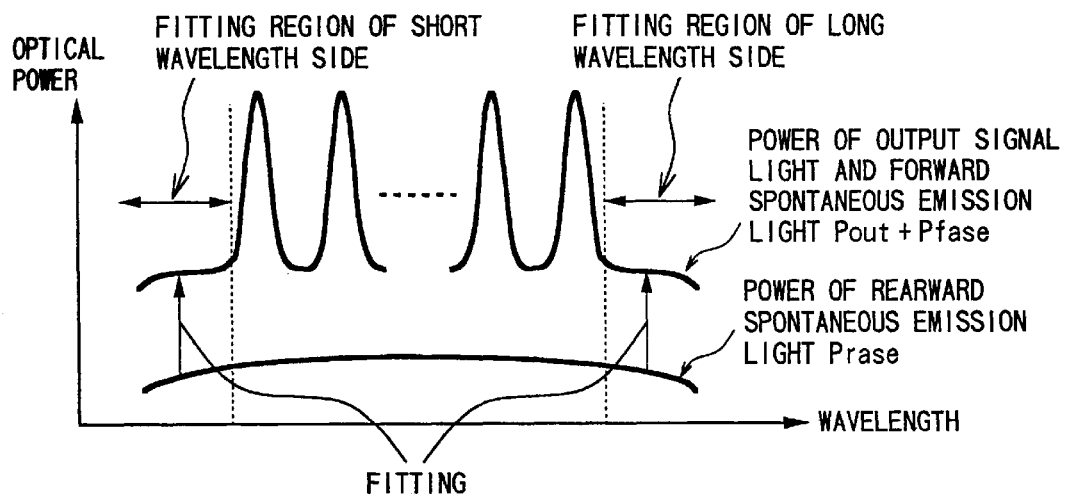
FIG. 14 is a conceptual diagram showing another example of the fitting process performed by the characteristic measuring method according to the second basic principle of the present invention.
Figure 15:
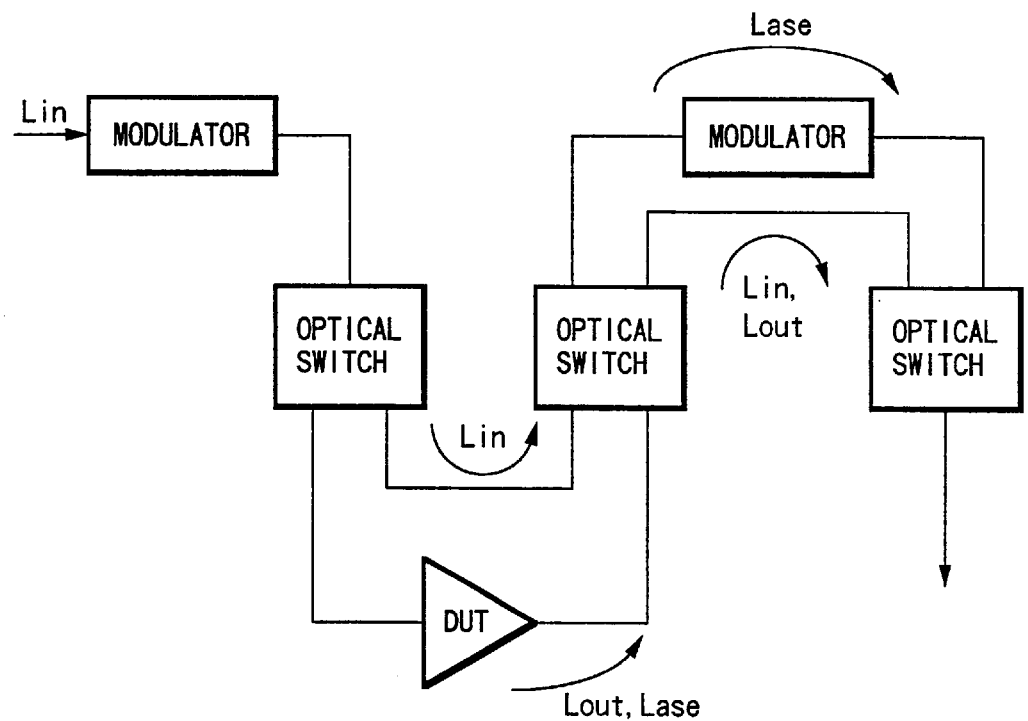
FIG. 15 is a diagram showing a configuration example of a measuring system in a conventional pulse method.
Figure 16:
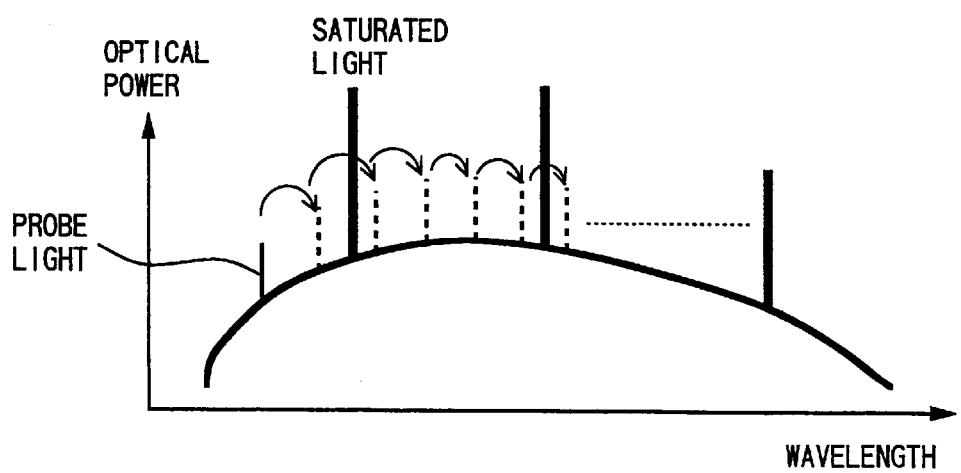
FIG. 16 is a diagram for explaining an outline of a conventional probe method.
Figure 17:
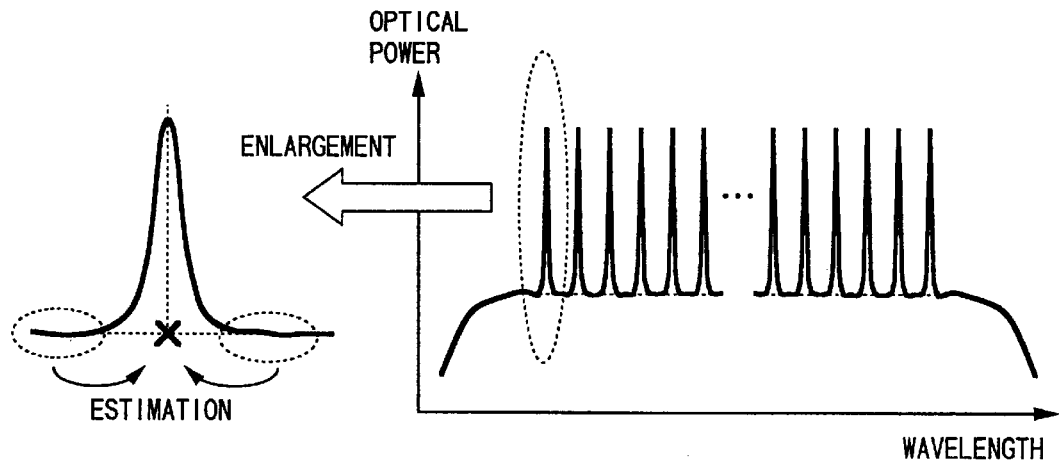
FIG. 17 is a diagram for explaining an outline of a conventional interpolation method.
Figure 18:
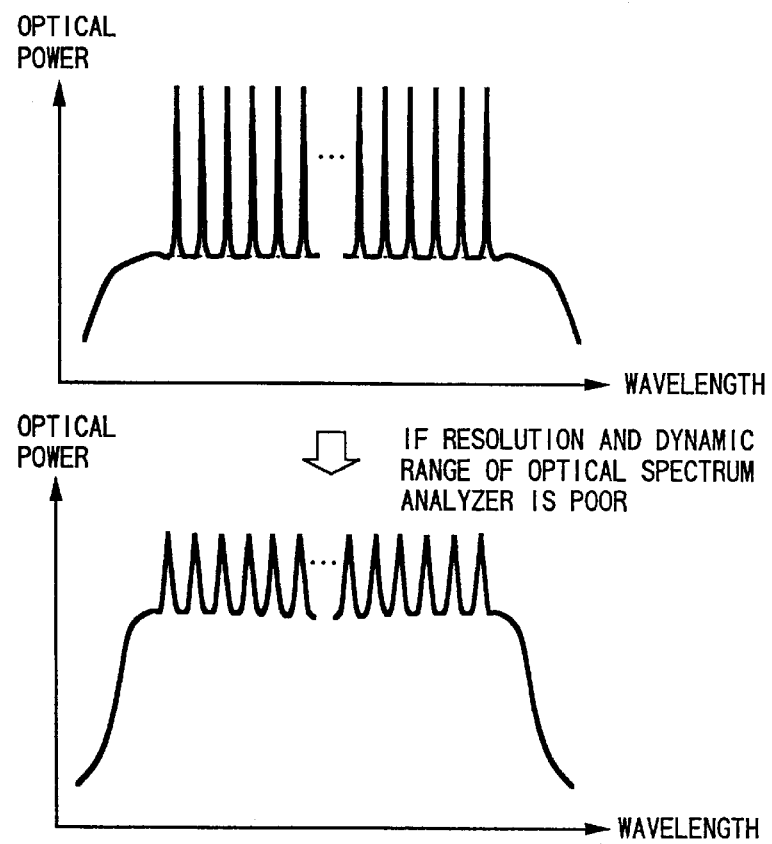
FIG. 18 is a diagram for explaining influences of the performance of measuring devices in the conventional interpolation method.

FIG. 14 is a conceptual diagram showing another example of fitting process performed by the characteristic measuring method according to the second basic principle.

In the another example shown in FIG. 14, the power level of the spontaneous emission light outside the wavelength band of the WDM signal light input to the optical amplifier 1 is utilized to perform fitting process of the spectrum of the rearward spontaneous emission light Lrase to the spectrum of the output light from the optical amplifier 1. That is to say, regarding the spectrum of the rearward spontaneous emission light Lrase as shown in the lower part of the figure and the spectrum of the output light from the optical amplifier 1 as shown in the upper part of the figure, the power levels of both the region a little away from the shortest wavelength on the short wavelength side and the region a little away from the longest wavelength on the long wavelength side are obtained. Then, the spectrum of the rearward spontaneous emission light Lrase is fitted to the spectrum of the output light from the optical amplifier 1 such that a difference between the two power level values corresponding to the regions is the lowest.

In this manner, when the fitting process of the rearward spontaneous emission light Lrase to the spectrum of the output light from the optical amplifier 1 has been completed, the power level at each signal light wavelength is then read out for the spectrum of the fitting processed rearward spontaneous emission light Lrase, thus the forward spontaneous emission light Pfase corresponding to each signal light wavelength is obtained. Furthermore, the output signal light power Pout corresponding to each signal light wavelength is obtained by using the spectrum of the spectrum of the output light from the optical amplifier 1.

The measured value of each of the input signal light power Pin, the output signal light power Pout and the spontaneous emission light power Pase of each signal light wavelength obtained as mentioned above can be utilized similarly to the case of the characteristic measuring method according to the first basic principle mentioned above, for example to calculate the gain, the noise figure and the like of the optical amplifier.

In this manner, in the characteristic measuring system applied with the characteristic measuring method according to the second basic principle, by utilizing the spectrum of the rearward spontaneous emission light Lrase actually measured, the spectrum of the forward spontaneous emission light Lfase contained in the output light from the optical amplifier 1 is estimated, and thus the forward spontaneous emission light power Pfase is obtained. Consequently, it is possible to achieve an improvement in the measurement accuracy while merits such as ease of measurement, simplicity of measuring system, measurement speed and the like of the conventional interpolation method and the like are maintained.

Here, for a measurement technique utilizing the rearward spontaneous emission light of an optical amplifier, for example, a technique described in Japanese Unexamined Patent Publication No. 8-255940, a prior application by the present applicant, is well known. In this known technique, a method for obtaining the shape of the spectrum of the rearward spontaneous emission light by fitting is disclosed. It is also possible to utilize this method for spectrum measurement of the rearward spontaneous emission light in the characteristic measuring method according to the above-mentioned second basic principle. In the characteristic measuring method according to the second basic principle, by further fitting the spectrum of the rearward spontaneous emission light to the spectrum of the output light from the optical amplifier 1, it is possible to obtain not only the shape of the spectrum but also the absolute value (power level) of the forward spontaneous emission light. In this manner, characteristic measurement can be realized with higher accuracy.

What is claimed is:

1. A characteristic measuring method of an optical amplifier for amplifying a wavelength division multiplexed signal light in which a plurality of signal lights of different wavelengths are multiplexed, wherein a plurality of signal lights corresponding to respective signal light wavelengths in a measurement wavelength band are divided into at least two or more groups such that signal lights of adjacent wavelengths are in different groups, the power of each signal light is adjusted such that the total power of the signal lights in said each group is approximately equal to a preset reference value, a wavelength division multiplexed signal light containing the multiplexed signal lights is input in turn for each group to said optical amplifier, to measure a spectrum of the output light from said optical amplifier for said each group, and based on these spectrum measurement results for said each group, the output signal light power and the spontaneous emission light power of each signal light wavelength in a measurement wavelength band are determined.

2. A characteristic measuring method according to claim 1, wherein for said plurality of signal lights corresponding to respective signal light wavelengths in said measurement wavelength band, channel numbers sequentially assigned in accordance with each wavelength are divided into groups for odd numbers and groups for even numbers.

3. A characteristic measuring method according to claim 1, wherein
said plurality of signal lights corresponding to respective signal light wavelengths in said measurement wavelength band are divided into an X number of groups, and where signal light wavelengths N are arranged such that no adjacent signal light wavelength of the N signal light wavelengths are in the same group.

4. A characteristic measuring method according to claim 1, wherein
a spectrum of the wavelength division multiplexed signal light input to said optical amplifier is measured, to determine the input signal light power of each signal light wavelength in the measurement wavelength band.

5. A characteristic measuring system for measuring characteristics of an optical amplifier for amplifying a wavelength division multiplexed signal light in which a plurality of signal lights of different wavelengths are multiplexed, comprising:
a light source section which can generate a plurality of signal lights corresponding to respective signal light wavelengths in a measurement wavelength band;
a control section for dividing into the plurality of signal lights generated by said light source section at least two or more groups such that signal lights with adjacent wavelengths are in different groups, and adjusting the power of each signal light generated by said light source section such that the total power of the signal lights in each group is approximately equal to a preset reference value, to input in turn a wavelength division multiplexed signal light containing the multiplexed signal lights for each group to said optical amplifier;
a measuring section which can measure the output light spectrum from said optical amplifier for each group; and
a determining section for determining based on the spectrum measurement results by said measuring section, the output signal light power and the spontaneous emission light power of each signal light wavelength in the measurement wavelength band.

6. A characteristic measuring system for measuring characteristics according to claim 5, wherein
said control section switches and outputs one of the input signal light to said optical amplifier and the output light from said optical amplifier to said measuring section, and
said determining section determining, based on the spectrum measurement results by said measuring section, the input signal light power, the output signal light power and the spontaneous emission light power of each signal light wavelength in the measurement wavelength band.

7. A characteristic measuring system according to claim 6, wherein
said determining section uses the input signal light power, the output signal light power and the spontaneous emission light power determined for each signal light wavelength in the measurement wavelength band, to calculate at least the gain and noise figure of said optical amplifier.

8. A characteristic measuring system according to claim 5, wherein
said light source section includes a variable wavelength light source which can adjust the wavelength of generated signal light, and
said control section separates the plurality of signal lights into groups by controlling the wavelength of said variable wavelength light source.

9. A characteristic measuring system according to claim 5, wherein
said light source section includes a fixed wavelength light source which generates a fixed wavelength signal light, and
said control section separates the plurality of signal light into groups by adjusting the power of the signal lights generated by said fixed wavelength light source.

10. A characteristic measuring system according to claim 5, wherein
said control section controls the distribution of signal light power in the measurement wavelength band in each group to be approximately uniform with respect to the wavelength direction.

11. A characteristic measuring method of an optical amplifier for amplifying a wavelength division multiplexed signal light in which a plurality of signal lights of different wavelengths are multiplexed, wherein
a wavelength division multiplexed signal light that does not include a signal light of a first wavelength, being one of said plurality of signal lights, and whose total power is controlled so as to be greater than the total power obtained in the case that the signal light of the first wavelength is not input and also so as to be approximately equal to the total power of the wavelength division multiplexed signal light, including the first wavelength, is input to said optical amplifier, and
the power of the signal light corresponding to the first wavelength among the output signal lights of said optical amplifier is measured, to thereby detect the power of the spontaneous emission light from said optical amplifier corresponding to said first wavelength when said wavelength division multiplexed signal light is input.

12. A characteristic measuring system of an optical amplifier provided with a measuring device for measuring an output signal from an optical amplifier for amplifying a wavelength division multiplexed signal light in which a plurality of signal lights of different wavelengths from a light source section are multiplexed, comprising:
a control section for controlling said light source section so that a wavelength division multiplexed signal light that does not include a signal light of a first wavelength, being one of said plurality of signal lights, and whose total power is controlled so as to be greater than the total power obtained in the case that the signal light of the first wavelength is not input and also so as to be approximately equal to the total power of the wavelength division multiplexed signal light, including the first wavelength, is input to said optical amplifier, and
a determining section for determining with said measuring device the power of the signal light corresponding to the first wavelength among the output signal lights of said optical amplifier, to thereby detect the power of the spontaneous emission light from said optical amplifier corresponding to said first wavelength when said wavelength division multiplexed signal light is input.

13. A characteristic measuring method of a wavelength division multiplexing optical amplifier, comprising:
dividing a plurality of signal lights into at least two or more groups such that signal lights of adjacent wavelengths are in different groups,
adjusting the power of each signal light such that the total power of the signal lights in said each group is approximately equal to a preset reference value, inputting in turn to the optical amplifier a wavelength division multiplexed signal light containing the multiplexed signal lights for each group, to measure a spectrum of the output light from the optical amplifier for each group, and determining, based on these spectrum measurement results for each group, the output signal light power and the spontaneous emission light power of each signal light wavelength in a measurement wavelength band.

14. A characteristic measuring system for measuring characteristics of an optical amplifier, comprising:

light source means generating a plurality of signal lights corresponding to respective signal light wavelengths in a measurement wavelength band;

control means dividing into a plurality of signal lights generated by said light source means at least two or more groups such that signal lights with adjacent wavelengths are in different groups, and adjusting the power of each signal light generated by said light source means such that the total power of the signal lights in each group is approximately equal to a preset reference value, to input in turn a wavelength division multiplexed signal light containing the multiplexed signal lights for each group to said optical amplifier;

measuring means measuring the output light spectrum from said optical amplifier for each group; and determining means for determining based on the spectrum measurement results by said measuring means, the output signal light power and the spontaneous emission light power of each signal light wavelength in the measurement wavelength band.

* * * * *